United States Patent Office 3,207,622
Patented Sept. 21, 1965

3,207,622
METHOD OF PRODUCING HYDROPHOBIC-ORGANOPHILIC MAGNETIC PIGMENTS
Roderic B. Perkins, Jr., Highland, Ind., assignor to Standard Oil Company, Chicago, Ill., a corporation of Indiana
No Drawing. Filed Mar. 5, 1962, Ser. No. 177,154
1 Claim. (Cl. 117—100)

This invention relates to the preparation of improved magnetic pigments and, more particularly, is concerned with the preparation and use of magnetic pigments having improved hydrophobic and organophilic properties.

This application is a continuation-in-part of my application Serial No. 851,494, filed November 9, 1959, now abandoned.

Historically, the primary function of printing inks has been the transmission of visual information. In recent years, the utility of printing inks has greatly increased with the advent of electronic equipment for automatic sorting of printed materials such as, for example, checks, postage stamps, business forms, cards, letters, and so forth.

Various elements such as, for example, iron, cobalt, and nickel possess specific magnetic properties. A solid block of these materials includes very small magnetic units. These magnetic units can be oriented by the application of external magnetic fields. Once oriented, these magnetic units act together as small magnets and send out flux lines in unison. A specific amount of energy (saturation) is required to orient the magnetic units. Once oriented, the magnetized material is capable of emitting a predetermined amount of energy (flux). Small particles of magnetic material have been used as a pigment in printing inks. The magnetic particles may be used in lieu of or in combination with conventional non-magnetic ink pigment. The magnetic pigments may be oriented as the ink is applied to the printed surface and upon drying the magnetic pigment is permanently fixed with respect to the printed surface. This technique presents a permanent magnetic record. In the magnetic ink art, it is desirable to select a magnetically retentive material as a pigment, that is, a material which continues to emit flux lines after the energizing force is removed.

Lithographic printing presents an unusual problem in the selection of a magnetic ink suitable for magnetic reading equipment. Lithographic ink is basically a concentrated dispersion of pigment in a viscous, oily vehicle with various additives to give the ink suitable working properties. The ink may contain a drier to accelerate hardening of the vehicle after printing or a volatile solvent which evaporates from or penetrates into the paper. In the lithographic printing cycle, water is fed to the printing plate prior to the time the inking rollers contact the plate. The moisture film produced on the plate is continuous on the non-image area of the plate and acts as a barrier preventing adhesion of ink. Any moisture on the greasy area (image area) is discontinuous and does not prevent the transfer of ink to the greasy area. It is a common practice to add a desensitizing gum and an acid to the dampening water to provide sharp contrast between the figures and the background. Wetting agents may be used in the dampening water; however, excessive wetting agents cause the formation of an ink-in-water emulsion. Due to the fact that the lithographic ink comes into intimate and continuous contact with water during the printing cycle, the ink must be free from any tendency to bleed or form an ink-in-water emulsion. The pigment used in such lithographic inks must have a strong affinity for the greasy materials, must be preferentially wet with hydrocarbons (organophilic), and must have practically no affinity for the wet portions of the plate (hydrophobic). The magnetically retentive pigments used in lithographic inks range in particle size from domain dimension up to about 10 microns in dimension. The magnetically retentive pigment particles are hydrophilic and, consequently, tend to be washed out of the lithographic ink by the aqueous fountain solution.

Briefly described, the present invention provides a hydrophobic-organophilic magnetic ink pigment which is suitable for use in lithographic printing. The magnetic ink pigment comprises discrete particles of a magnetically retentive material having an extremely thin permanent coating of a resin obtained by the polymerization of an unsaturated hydrocarbon oil derived from the pyrolysis of hydrocarbons at very high temperatures, short contact time and relatively low pressure, commonly referred to as "dripolene."

One source of dripolene is a condensate product from the pyrolysis of hydrocarbons in the vapor phase at temperatures from at least about 1250° to 1800° F., at pressures below about 100 p.s.i.a. usually below about 50 p.s.i.a., and at contact times from about 0.05 to 5 seconds, usually below about 2 seconds. Suitable feeds are ethane, propane, butane, propylene, butylene, naphthas, gas oils and other hydrocarbons which can be vaporized at the temperature of pyrolysis without an excessive amount of coke formation. The high temperature vapor phase pyrolytic reaction is normally used for the production of olefinic gases, such as, ethylene and propylene; and for the production of aromatic hydrocarbons, such as, benzene, toluene and xylene.

The hot gases from the pyrolysis zone are cooled below the reaction temperature, and preferably below about 100° F. by quenching with a stream of water, oil or other cooling medium, whereby further pyrolysis, polymerization or degradation of the reaction product is prevented. The unsaturated hydrocarbon condensate is separated from the quenching liquid, as by stratification, distillation, etc. The yield of this hydrocarbon condensate, or dripolene, is ordinarily about 3% by weight of the total quantity of gas charged to the pyrolysis reaction, the remainder of the gas being converted to lower molecular weight hydrocarbons such as ethylene and propylene, and to hydrogen.

The amount of dripolene produced is dependent upon the feed, temperature, contact time and the pressure. The preferred operating conditions for the production of the hydrocarbons employed herein are a temperature from about 1350° to 1550° F., a contact time of about 1 second, a pressure of about 50 p.s.i.a., and a feed consisting primarily of ethane or propane, or mixtures thereof.

The total unsaturated condensate is an extremely complicated mixture of hydrocarbons. The tar, which is defined as the material boiling above about 400° F., consists mainly of naphthalene and alkylated naphthalene. An appreciable amount of anthracene is present and the remainder is thought to consist of condensed-benzene ring compounds.

The presence of a considerable amount of unsaturated linkages in the dripolene is evidenced by maleic anhydride values above about 60 and by the ease with which the dripolene can be polymerized either thermally or by using catalysts such as $AlCl_3$ or $BF_3$. Dripolene has never been completely analyzed because of its complexity. However, some of the components boiling below about 300° F. have been identified. These comprise minor amounts of propane, butane and pentane; some propylene and butylenes; appreciable amounts of butadiene; cyclopentadiene and cyclohexadiene in fair amounts; cyclopentane and cyclopentene are also present; about one-half of the dripolene consists of benzene, toluene, xylene and ethylbenzene; styrene is present in appreciable amounts. The material boiling above 300° F. is known to contain some dicyclopentadiene; the remainder is thought to consist of higher boiling alkylated benzenes, condensed cycloolefins and cyclodienes; in addition aromatics which have been alkylated with cycloolefins and/or cyclodienes are though to be present. When the ASTM end point of the dripolene is about 400° F., a minor amount of naphthalene is usually also present. The presence of naphthalene is detrimental to the freezing point of the dripolene and normally the dripolene is cut to an end point of about 375° F. to eliminate naphthalene.

A typical dripolene fraction has the following properties and composition.

ASTM distillation range, ° F.:
| | |
|---|---|
| Initial | 100 |
| 10% | 146 |
| 20% | 162 |
| 30% | 178 |
| 40% | 188 |
| 50% | 196 |
| 60% | 206 |
| 70% | 234 |
| 80% | 296 |
| 90% | 340 |
| Final | 360 |

Gravity, ° API at 60° F. _____ 34.7
Bromine number, cg. $Br_2$/g. _____ 104.1
Maleic anhydride value, mg. M.A./g. _____ 79
Index of refraction, $n_D^{25}$ _____ 1.4830

Analysis, volume-percent:
| | |
|---|---|
| Propane and propylene | 0.7 |
| Isobutane | 0.1 |
| Isobutylene | 0.8 |
| 1-butene | 0.5 |
| 2-butene | 0.6 |
| n-Butane | 0.4 |
| Butadiene | 3.9 |
| Pentadienes | 7.7 |
| Pentylenes | 6.3 |
| Other $C_5$ | 0.4 |
| Benzene | 34.2 |
| Toluene | 7.8 |
| Xylenes | 1 |
| Styrene | 3 |
| Dicyclopentadiene | 5 |
| Other | 29.6 |

A dripolene as described above may be polymerized to a resin by various known techniques. One technique is to contact the normally liquid mixture of dripolene with above about 0.5% by weight of boron trifluoride and at least about 0.02% by weight of iodine at a temperature above about 500° F. as described in U.S. 2,631,996, to convert the unsaturated hydrocarbons into a thermoplastic resin. Another known method is to thermally polymerize the dripolene by subjecting it to elevated temperature and pressure for a period of time sufficient to form a solid resin. Typically, this would include a temperature between about 425° F. and 575° F. and a pressure between about 150 p.s.i.g. and 400 p.s.i.g. The reaction product from the polymerization step may be stripped to a desired softening point, usually, to a temperature of 200 to 250° F.

In preparing the pigments of the invention it is preferred to employ a thermally polymerized bottoms fraction of a total dripolene produced as a by-product of the high temperature pyrolysis of $C_2$–$C_5$ gases. Typically, such a total dripolene is fractionated to provide a 15 to 35 percent bottoms fraction, preferably about a 20 to 25 percent bottoms fraction which has the following typical properties.

| | |
|---|---|
| Gravity, ° API | 21.1 |
| Bromine number, cg. $Br_2$/gr. | 117 |
| Iodine number, Wijs, cg. $I_2$/gr. | 259 |
| Maleic anhydride value, mg. M.A./g. | 79 |

ASTM distillation range, ° F.:
| | |
|---|---|
| Initial | 176 |
| 10% | 223 |
| 30% | 270 |
| 50% | 325 |
| 70% | 351 |
| 90% | 378 |
| Final | 563 |

Benzene content, percent _____ 24

A resin produced by thermally polymerizing the above bottoms fraction at 460–510° F. for 16 hours, typically, shows a minimum iodine number (Wijs) of 150.

The above-described bottoms fraction of dripolene preferably is further fractionated, as by steam distillation, to provide approximately an 80% overhead fraction, which is then thermally polymerized. A typical inspection of this latter fraction shows the following properties.

ASTM distillation range, ° F.:
| | |
|---|---|
| Initial | 174 |
| 10% | 209 |
| 30% | 250 |
| 50% | 296 |
| 70% | 333 |
| 90% | 376 |
| Final | 432 |

Benzene content, percent _____ 26
Gravity, ° API at 60° F. _____ 23.2
Bromine number, cg. $Br_2$/g. _____ 109
Iodine number (Wijs) cg. $I_2$/gr. _____ 268
Maleic anhydride value, mg. M.A./g. _____ 36.1

A preferred method of thermally polymerizing the latter dripolene fraction comprises charging the dripolene to a polymerization zone containing a reactor equipped with heating and cooling means as well as means for agitating its contents. The temperature within the reactor is raised approximately 100° F. per hour until a temperature of about 250° F. is reached. The reaction system is then vented to remove any traces of water from the charge material. The temperature is then raised slowly to about 450–460° F., typically giving a total heat-up time of about 8–12 hours. The reactor is held at approximately 450–460° F. and under a pressure of about 300 p.s.i.g. for a period of about 6–16 hours. At the end of this time the reactor contents are cooled to about 400° F. or below. The reaction system is then vented to the atmosphere and the reactor contents stripped with steam and natural gas to the desired viscosity or softening point.

Typically, the above thermally polymerized resin has an iodine number of about 140–160, while the above catalytically polymerized resin has a usually maximum iodine number of about 80. The more highly unsaturated material is preferred for use in the present invention, and magnetic ink comprising pigment coated with the thermally polymerized resin has been found to be a superior lithographic ink.

The following example describes the method of preparing a magnetic ink pigment according to the present invention.

*Example*

A thermally polymerized dripolene, of the type last-described hereinbefore and having a softening point of 210° F. was mixed with a solvent. The solvent used was a petroleum naphtha of Varnish Makers and Paint quality. This particular naphtha has a distillation initial boiling point of 200° F. and a distillation end point of 330° F. The resin was added to the naphtha until the mixture consisted of 30% resin and 70% naphtha. Iron oxide pigment particles were added to the resin-naphtha mixture until a slurry was obtained. The resin-naphtha-iron oxide slurry was heated to a temperature of 225° F. for a period of 5 minutes. The slurry was cooled and passed to a filter. The iron oxide particles with a thin resin coating were retained on the filter paper whereas the excess resin-solvent mixture was recovered as it passed through the filter paper. The resin-coated iron oxide particles were dried and thus formed an organophilic-hydrophobic magnetic pigment.

Other volatile solvents such as, for example, Stoddard solvent, cleaner's naphtha, benzene, toluene, and the like may be used to accomplish the purpose of this invention.

A distinctively water repellent pigment is obtained when the weight of the coating resin is as little as 0.1% of the weight of the magnetically retentive material pigment. It is preferred, however, that the pigment contain from about 1% to about 5% by weight of the coating material. It has been found that this particular range exhibits satisfactory water repellence and resistance to the aqueous fountain solution without suffering a marked reduction in flux emission.

Having described my invention, what I claim is:

The method of producing an organophilic-hydrophobic magnetic pigment which comprises dissolving a resin obtained by the thermal polymerization at a temperature of about 450–460° F., and a pressure of about 300 p.s.i.g. for a period of about 6–16 hours of an unsaturated hydrocarbon oil derived from pyrolysis of the hydrocarbons in the vapor phase at a temperature above about 1250° F., a contact time from about 0.05 to 5 seconds, a pressure below about 100 p.s.i.a. in a petroleum naphtha having an initial boiling point of about 200° F. and an end point of about 330° F., said resin having an iodine number of about 140–160 (Wijs) and a softening temperature of from about 200° F. to about 210° F., adding magnetic iron oxide pigment particles to the resin-naphtha solution to form a slurry, heating said slurry to a temperature of about 225° F. and refluxing said slurry, filtering said slurry to separate said iron oxide particles wetted with said resin, and drying said wetted particles to form a permanent resin-coated iron oxide particulate organophilic-hydrophobic pigment, the weight of said coating being from about 1 percent to about 5 percent of the weight of said pigment.

References Cited by the Examiner

UNITED STATES PATENTS

| | | | |
|---|---|---|---|
| 2,559,498 | 7/51 | Garber et al. | 260—82 |
| 2,631,996 | 3/53 | Wadsworth | 260—82 |
| 2,798,866 | 7/57 | Gordon et al. | 260—82 |
| 3,054,751 | 9/62 | Blake et al. | 252—62.5 |

WILLIAM D. MARTIN, *Primary Examiner.*

MAURICE A. BRINDISI, *Examiner.*